R. VUILLEUMIER.
SAFETY VENT FOR FLUID CONTAINERS.
APPLICATION FILED APR. 9, 1915.
1,248,578. Patented Dec. 4, 1917.
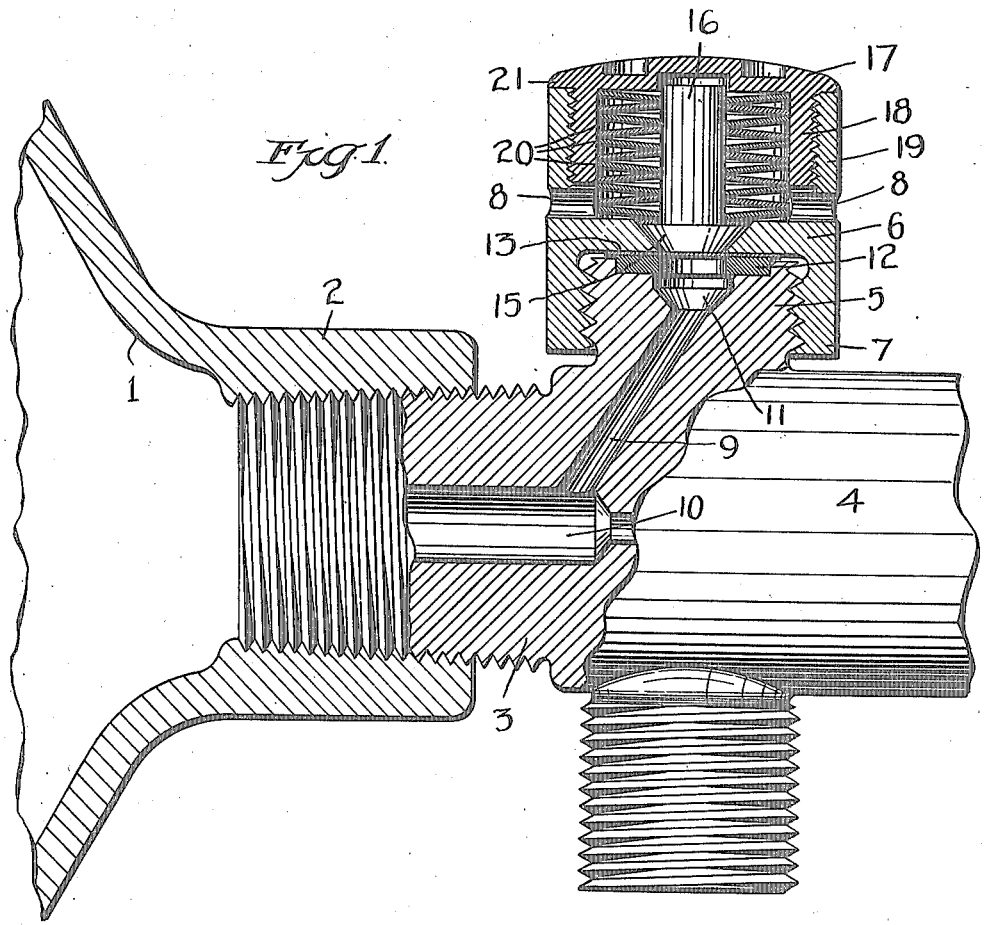
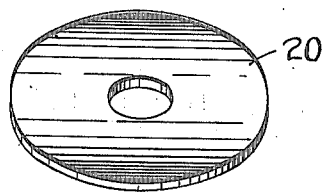
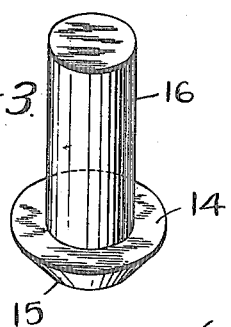
WITNESSES
Geo. A. Lenier
INVENTOR:
Rudolph Vuilleumier
BY
Chas. M. Chapman,
ATTORNEY.

UNITED STATES PATENT OFFICE.

RUDOLPH VUILLEUMIER, OF NEW ROCHELLE, NEW YORK, ASSIGNOR TO SAFETY CAR HEATING & LIGHTING COMPANY, A CORPORATION OF NEW JERSEY.

SAFETY-VENT FOR FLUID-CONTAINERS.

1,248,578.

Specification of Letters Patent.

Patented Dec. 4, 1917.

Application filed April 9, 1915. Serial No. 20,122.

*To all whom it may concern:*

Be it known that I, RUDOLPH VUILLEUMIER, a citizen of the United States, residing at New Rochelle, county of Westchester, and State of New York, have invented a new and useful Improvement in Safety-Vents for Fluid-Containers, of which the following is a description.

This invention has reference to safety vents for fluid containers, and has particular reference to safety valves for containers for a gas under pressure.

Among the objects of my invention may be noted the following: to provide a safety vent for fluid containers which will protect the latter against injury or rupture when, through accidental causes, such as in case of fire, the pressure within the container rises above the normal working pressure; to provide a safety vent for fluid containers which, under normal pressure conditions, hermetically seals the container so that no leakage can take place until the moment of danger is reached; to provide a safety vent which, during the first stages of its action, will not at once release the fluid contents of the container, but which will operate during the further action thereof to relieve excessive pressure within the container; to provide a safety vent which has all the advantages of the well-known frangible diaphragm structure, but none of its disadvantages, such as premature rupture, due to gradual fatigue of the material, and such as results from the necessity of loading the same within a close margin of its elastic limit to enable it to be sufficiently responsive; to provide a safety vent which has all the advantages of the spring-loaded safety valve, and the additional advantage of freedom from leakage which, in case of high pressure gas containers of limited capacity, becomes an important factor; and to provide a simple, compact and inexpensive safety vent or valve, embodying all the advantages noted, and which, by reason of its structure, is applicable to either the valve or usual vent of the containers, or directly to the container.

With the above objects in view, and others which will be detailed during the course of this description, my invention consists in the parts, features, elements and combinations thereof hereinafter described and claimed.

In order that my invention may be clearly understood, I have provided drawings wherein:

Figure 1 is a sectional elevation showing a portion of a container with a valve or vent applied thereto, and embodying my invention;

Fig. 2 is a perspective view of a form of spring disk which I have adopted for creating the normal pressure or counter pressure upon the valve; and Fig. 3 is a perspective view of the valve and its stem shown seated in Fig. 1.

Referring to the drawings, the numeral 1 indicates a vessel, tank or so-called container adapted for the reception of fluids under pressure and, particularly, a gas. The neck 2 of the container is internally screw-threaded, and is thus adapted to receive the externally screw-threaded extension 3 of a valve structure, vent or outlet medium 4 of any suitable form or design. A lateral externally screw-threaded member 5 of the said medium is adapted to receive the body member 6 of the safety valve or vent, the same having an internally screw-threaded part 7 adapted to fit the extension 5. The body member 6 is provided with radial vents 8 at several points, and these vents may be as numerous as desired. The extension 5 has a bore or passage 9 which communicates with the bore or passage 10 in the medium 4, and said passage 9 terminates in a chamber 11, surrounded by a shoulder or seat adapted to receive an apertured gasket 12. This gasket is preferable, though not necessary, since it will be readily understood that a tight joint between the extension 5 and body member 6 can be produced by giving the coöperating parts a ground finish.

A diaphragm 13 is interposed between the gasket 12 and the adjacent surface of the body member 6, or said diaphragm may be directly in contact with the adjacent surface of the extension 5, in which event, the gasket is not employed, as above suggested. This diaphragm is composed of some frangible material of practically little strength, such as fiberloid, and, as said diaphragm is not intended to withstand any great pressure, acts more as, or serves more as, a gas-tight seal for the valve seat. The valve seat is formed by a flared aperture substantially in the center of the body member 6, in which is seated the valve 14 which is preferably in the form of a truncated cone, and which is so formed as to perfectly fit the valve seat and have its bottom 15 normally at rest, and literally without pressure upon the adjacent surface of the diaphragm 13. In other words, the valve bottoms in its seat simultaneously with its contact with the surface of the diaphragm over the chamber 11, so that it may be said that the bottom 15 of the valve and the surface of the diaphragm and the coöperating surface of the body member 6 are flush. This construction preserves all the characteristics of the diaphragm, and, at the same time, exposes the valve to substantially all the pressure within the container. Hence, it will be appreciated what is meant above by reference to the diaphragm acting as a seal for the under seat of the valve.

The valve has the long stem 16, operating within the chamber of the cap 17, which is provided with the reduced stem 18 externally screw-threaded to coöperate with the internal screw-threads of the extension 19 of the body member 6.

Within the chamber of the cap 17, and sleeved upon the stem 16 of the valve, is a plurality of convexed, centrally perforated spring disks 20, said disks being arranged in pairs as shown in Fig. 1, the members of the pairs being superposed with their concave faces together, and the pairs being arranged so that the convexed surfaces of adjacent pairs will be in contact. This construction provides, not only great strength, but a high degree of resiliency and the springs thus arranged or nested within the chamber of the cap 17 are, by the normal seating of the flange 21 of the cap upon the end of the extension member 19, caused to exert a counter pressure upon the valve which will counterbalance the normal working pressure of the fluid within the cylinder, thus preventing such normal pressure from either distorting or flexing the diaphragm 13, or unseating the valve. It will be understood a greater number of springs may be employed, or the stem 18 of the cap 17 may be made longer, whereby any degree of pressure can be exerted upon the valve to hold the same seated in opposition to pressure within the container; but, the arrangement shown by me in Fig. 1 is gaged to a nicety such that, when the flange 21 of the cap engages the end of the extension 19, the springs 20 are under compression sufficient to exert the proper counter-balancing pressure upon the valve to prevent the same from being lifted or unseated by the normal (whatever it may be) working pressure of the fluid in the cylinder. It may be found desirable to interpose washers between the head of the valve and the first spring coöperating therewith, as shown in section in Fig. 1, to adjust the spring pressure.

From the foregoing description the following mode of operation will be readily understood:

Under the normal working pressure of the fluid within the container 1, the diaphragm and valve will be normally in the position shown in Fig. 1; and the force of the springs is so proportioned that the valve 15 will remain in such position as long as the normal working pressure of the container is not exceeded. The diaphragm, acting practically as a gas-tight seal for the valve, undergoes no deformation or strain as long as the valve remains normally seated. However, as the normal pressure in the container is exceeded, the valve 15 tends to leave its normal position, and the diaphragm, following the movements of the valve, begins to be distorted. As the pressure increases, and the movement of the valve correspondingly increases, the deformation of the diaphragm becomes so great that rupture of the same occurs and the gas can escape freely between the valve and its seat, and thence through the radial vents. This condition will continue until the excess pressure in the container has been reduced to normal working pressure, whereupon the valve will become seated under the counter pressure of the springs 20, and stops the flow of gas. Any subsequent increase in pressure within the container will cause the operation of the valve, through the ruptured diaphragm, until such excess pressure is relieved or reduced. Thus, it will be understood that, although the springs are under a constant load, nevertheless, their strength is so proportioned that the load of the material is well within its elastic limit. It follows, therefore, that, by the combination of the diaphragm and springs, the element of fatigue is removed.

In connection with the foregoing, I wish it understood that my invention is not limited to its application to the valve stem or vent of the container, but may be applied directly to the latter with the exercise only of mechanical skill.

Having thus described my invention, what I claim and desire to secure by Letters Patent is:

1. A safety vent for fluid containers having a passage therethrough and a valve-seat at the end of said passage, a spring-controlled valve normally at rest upon said seat under predetermined pressure and closing said passage, and a frangible diaphragm normally engaged with said valve on one side, and exposed to fluid pressure on the other side.

2. A safety vent for fluid containers having a passage therethrough and a valve normally closing said passage, and a frangible diaphragm independent of said valve but normally in contact therewith on one side, and exposed to fluid pressure on the other side.

3. A safety vent for fluid containers having a passage therethrough and a frangible diaphragm for closing said passage exposed to the fluid pressure within the container, a valve-seat adjacent said diaphragm, a valve normally at rest against the seat and in mere contact with the diaphragm, and means coöperating with the valve to counterbalance the working pressure within the container to which the diaphragm is exposed.

4. A safety vent for fluid containers having a valve seat and comprising a frangible diaphragm exposed on one side to the fluid pressure within the container, a valve normally at rest upon said valve seat and against, but without pressure on, the diaphragm on the other side, and means coöperating with the valve to counterbalance the working pressure within the container to which the diaphragm is exposed.

5. A safety vent for fluid containers having a passage terminating in a valve seat, a frangible diaphragm sealing one end of said seat and exposed to pressure on one side within the passage, a valve coöperating with the diaphragm on the other side and normally at rest upon said seat to close the valve-seat, pressure means coöperating with the valve to counterbalance the pressure to which the diaphragm is exposed, and means for regulating the counterbalancing pressure.

6. A safety vent for fluid containers comprising a body member having a chamber, a cap for closing the same, a valve within the chamber normally seated in the body member, means for creating pressure upon the valve also located within the chamber, and means independent of the valve for sealing the valve-seat and normally engaging the valve, said means being exposed to pressure within the container.

7. A safety vent for fluid containers comprising a body member having a valve seat and a spring-controlled valve normally in engagement with said seat, a frangible diaphragm normally in contact with, but independent of, said valve, and means for combining the valve and diaphragm so that the latter is normally under no strain or pressure which will deform the same.

8. A safety vent for fluid containers comprising a valve member provided with an aperture surrounded by a seat; a valve under spring control for closing said opening and normally pressed into engagement with said seat; a diaphragm extended across said opening and normally in contact with said valve, the arrangement of the valve, valve-seat and diaphragm being such that the surface of the valve-seat at the opening, and the surface of the diaphragm at the opening, and the surface of the valve at said opening are substantially flush.

In testimony whereof I have hereunto signed my name in the presence of two subscribing witnesses.

RUDOLPH VUILLEUMIER.

Witnesses:
MAXWELL GREENBERGER,
FRANK BERKES.